US012304687B2

(12) United States Patent
Beckers et al.

(10) Patent No.: US 12,304,687 B2
(45) Date of Patent: May 20, 2025

(54) METHOD FOR OPERATING A LABELLING SYSTEM

(71) Applicant: Espera-Werke GmbH, Duisbug (DE)

(72) Inventors: Ronnie Beckers, Lummen (BE); Winfried Vicktorius, Duisburg (DE); Peter Wolff, Swisstal (DE)

(73) Assignee: Espera-Werke GmbH, Duisburg (DE)

( * ) Notice: Subject to any disclaimer, the term of this patent is extended or adjusted under 35 U.S.C. 154(b) by 301 days.

(21) Appl. No.: 17/781,579

(22) PCT Filed: Nov. 26, 2020

(86) PCT No.: PCT/EP2020/083505
§ 371 (c)(1),
(2) Date: Jun. 1, 2022

(87) PCT Pub. No.: WO2021/110533
PCT Pub. Date: Jun. 10, 2021

(65) Prior Publication Data

US 2023/0002100 A1 Jan. 5, 2023

(30) Foreign Application Priority Data

Dec. 2, 2019 (DE) ..................... 10 2019 132 710.5

(51) Int. Cl.
*B32B 41/00* (2006.01)
*B65C 1/02* (2006.01)
(Continued)

(52) U.S. Cl.
CPC .................. *B65C 9/40* (2013.01); *B65C 1/02* (2013.01); *B65C 9/46* (2013.01); *B65C 2009/402* (2013.01)

(58) Field of Classification Search
CPC .... B65C 9/40; B65C 1/02; B65C 9/46; B65C 2009/402; B65C 1/021; B65C 9/26; B32B 41/00
(Continued)

(56) References Cited

U.S. PATENT DOCUMENTS 5,478,422 A 12/1995 Bright et al.
8,012,279 B2 9/2011 Thiel et al.
(Continued)

FOREIGN PATENT DOCUMENTS

DE 102008032019 A1 1/2010
EP 3147089 A1 3/2017

OTHER PUBLICATIONS

International Search Report dated Mar. 9, 2021 filed in PCT/EP2020/083505.

*Primary Examiner* — Michael N Orlando
*Assistant Examiner* — Joshel Rivera
(74) *Attorney, Agent, or Firm* — Rankin, Hill & Clark LLP

(57) ABSTRACT

The invention relates to a method for operating a labelling system which comprises a labelling device (1) having a feed assembly (2), a dispensing assembly (4) and an application assembly (6); wherein at least one of these functional units comprises a sensor assembly (8, 9, 10); wherein, in a labelling routine, a control assembly (11) activates the functional units in order to carry out the labelling process; wherein, in a monitoring routine, a monitoring assembly (12) captures the sensor data detected by the sensor assemblies (8, 9, 10), which data correspond to a sensor capture density specified for the corresponding functional unit; wherein the labelling system comprises a user interface (13). According to the invention, in a user-query routine, a user is prompted by the user interface (13) to input a state relating to a functional aspect of the labelling system, and the input
(Continued)

Figure 1:
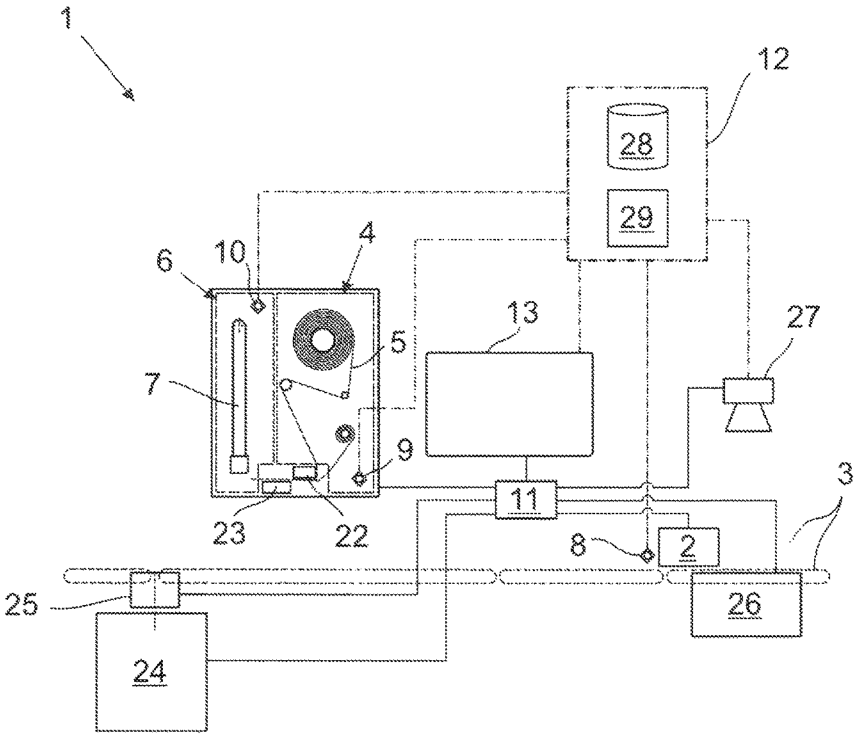

state is transmitted to the monitoring assembly (12), which compares the input state with a specified state and, in the event of deviation, executes an internal response routine in which a sensor capture density, which is changed with respect to the previous sensor capture density, of at least one functional unit is specified; and, following the user query routine, the labelling routine and the monitoring routine are executed using the changed sensor capture density specified from the user query routine.

24 Claims, 2 Drawing Sheets

(51) Int. Cl.
*B65C 9/40* (2006.01)
*B65C 9/46* (2006.01)

(58) Field of Classification Search
USPC .................... 156/60, 64, 350, 351, 378, 379
See application file for complete search history.

(56) References Cited

U.S. PATENT DOCUMENTS

| | | | | |
|---|---|---|---|---|
| 9,302,459 | B2 | 4/2016 | Hussain et al. | |
| 2013/0340918 | A1 | 12/2013 | Dods | |
| 2014/0096900 | A1* | 4/2014 | Wojdyla | B65C 9/1803 156/247 |
| 2016/0052659 | A1* | 2/2016 | Bowers | B65C 1/021 156/64 |

* cited by examiner

METHOD FOR OPERATING A LABELLING SYSTEM

The invention relates to a method for operating a labeling system for labeling individual packs as claimed in the preamble of claim 1, a labeling system for labeling individual packs as claimed in the preamble of claim 21, a monitoring assembly for such a labeling system as claimed in the preamble of claim 22, and also a computer program as claimed in claim 24.

The labeling systems in question here for labeling individual packs comprise at least one labeling device, embodied in particular as a price labeling device. The labeling device comprises at least a feed assembly, a dispensing assembly and also an application assembly as functional units, which are configured for labeling the individual packs in a labeling routine. The functional units are controlled by means of a control assembly in the labeling routine.

In order to ensure reliable and accurate labeling, the functional units have respective sensor assemblies that determine sensor data associated with carrying out the labeling routine. On the basis of the determined sensor data, for example, the position, orientation and speed of the individual packs are ascertained and the application of the labels is controlled and/or checked. Modern labeling systems have a large number of sensors for the sensor assemblies, a large portion of the determined sensor data being utilized only briefly for the control of the functional units in individual labeling processes in the context of the labeling routine.

The invention additionally proceeds from the fact that the labeling system comprises a monitoring assembly, which during the labeling routine, in a monitoring routine, captures the sensor data determined by the sensor assemblies of the functional units in accordance with a sensor capture density predefined for the respective functional unit. The monitoring assembly is preferably embodied as a data logger and brings about for example regular storage of individual sensor data or variables derived from the sensor data. The sensor data captured by the monitoring assembly serve in particular to provide a history of sensor data for fault analyses, system improvements, for facilitating maintenance or the like. On account of the multiplicity of available sensors and the considerable amount of sensor data associated therewith, only a selected, small portion of the entire sensor data determined is captured in particular in predefined time intervals. The monitoring assembly captures the sensor data determined by the sensor assemblies in accordance with a sensor capture density predefined for the respective functional unit.

What is problematic here is that a multiplicity of sensor data that are possibly helpful for identifying various fault sources are not captured in the monitoring routine in order to avoid an overwhelming amount of sensor data. At the same time, systematic faults in the labeling routine that have a long-term effect on the labeling quality, through the brief utilization of the sensor data, are often not reliably recognized and not logged either.

The invention addresses the problem of specifying a method for operating a labeling system for labeling individual packs, wherein the monitoring of the labeling system is improved.

In the case of a method as claimed in the preamble of claim 1, the above problem is solved by means of the features of the characterizing part of claim 1.

What is essential is the fundamental consideration that, on the one hand, on account of the sensor assemblies already provided for carrying out the labeling routine, the labeling system can provide a sufficiently large amount of sensor data to enable thorough monitoring of the labeling system. On the other hand, systematic faults in the labeling routine are often perceived by the user, but the user is not readily able to identify the cause of the faults on account of the complexity of the labeling system.

It is specifically proposed that a user query routine is carried out by means of the monitoring assembly, in which user query routine a user, by means of the user interface, is requested to input a state relating to a functional aspect of the labeling system and the state thereupon input by the user is communicated to the monitoring assembly, in that the monitoring assembly compares the input state with a predefined state and, in the event of a deviation of the input state from the predefined state, carries out an internal reaction routine.

Furthermore, according to the proposal, it is provided that in the internal reaction routine, by comparison with the previous sensor capture density, a changed, in particular increased, sensor capture density of at least one functional unit is predefined, and that, following the user query routine, the labeling routine and the monitoring routine are carried out using the changed sensor capture density predefined from the user query routine.

It has been recognized that by means of the user query routine it is possible to determine whether there is possibly a defect in the labeling routine, whereupon the internal reaction routine is initiated, which brings about an adaptation of the monitoring routine.

On the basis of the result of the user query routine, the identification of possible causes of the input state is thus facilitated by virtue of the fact that a changed, in particular increased, sensor capture density for the further implementation of the monitoring routine is predefined for at least one functional unit. The sensor data are thus captured in reaction to the deviation from the predefined state in accordance with the changed sensor capture density for example for a fault analysis.

The solution according to the proposal can be implemented in a simple manner since, for carrying out the user query routine and for further capture of the sensor data, it is possible to have recourse to the sensor assemblies already provided on the labeling system.

The advantageous embodiments as claimed in claims 2 and 3 relate to the predefinition of the changed sensor capture density. In the particularly expedient embodiment as claimed in claim 4, the sensor capture density of at least one functional unit is changed by comparison with a predefined sensor capture density appertaining to normal operation.

Claim 5 relates to an assignment of at least one of the functional units to the state, whereby the sensor capture density can be changed in a targeted manner in relation to the at least one assigned functional unit and the capture of the sensor data is thus optimized further.

In the particularly user-friendly embodiment as claimed in claim 6, the user, by means of the user interface, is requested to select the state from a compilation of selectable states. The representation of a rising scale from a low to a high state by the compilation of selectable states simplifies the inputting of the state and the taking account thereof.

The advantageous embodiments as claimed in claims 7 and 8 relate to the change in the sensor capture density.

As claimed in claim 9, in the monitoring routine the sensor data captured by means of the monitoring assembly are stored and/or caused to be output, such that the sensor data captured in accordance with the changed sensor capture density can be used for a later evaluation.

In order to avoid an incorrect initiation of the internal reaction routine, in one preferred embodiment, a plausibility check of the input state is carried out by means of the monitoring assembly (claim 10).

Further functional units of the labeling device, the sensor data of which can likewise be captured in the monitoring routine, are defined in claim 11.

Claims 12 to 20 relate to preferred embodiments of the user query routine.

According to a further teaching as claimed in claim 21, this further teaching being accorded independent importance, the above-discussed labeling system for labeling individual packs which is configured for carrying out the method according to the proposal is claimed as such. Reference may be made to all explanations concerning the method according to the proposal.

According to a further teaching as claimed in claim 22, this further teaching likewise being accorded independent importance, the above monitoring assembly serving for carrying out the user query routine in the context of the method according to the proposal is claimed as such. Reference may be made to the above explanations concerning the method according to the proposal.

In one advantageous embodiment, the monitoring assembly comprises a memory having program instructions and at least one processor for implementing the user query routine (claim 23).

According to a further teaching as claimed in claim 24, this further teaching likewise being accorded independent importance, a computer program comprising program instructions is claimed which causes a processor of the monitoring assembly according to the proposal to execute the user query routine when the computer program runs on the processor. In this case, the computer program can be stored on a, in particular nonvolatile, memory. In this respect, too, reference may be made to the above explanations concerning the method according to the proposal.

Figure 2:
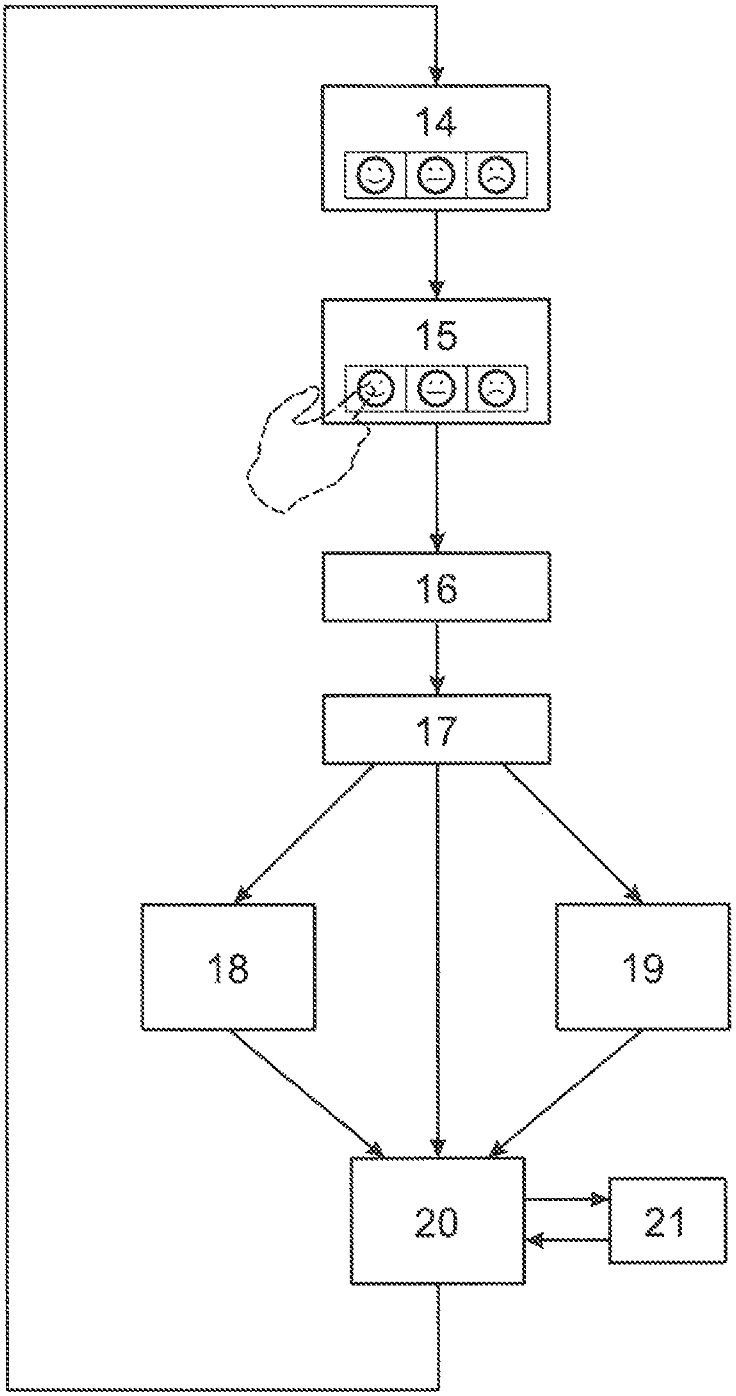

The invention is explained in greater detail below with reference to a drawing illustrating just one exemplary embodiment. In the drawing:

FIG. 1 shows a schematic illustration of the labeling system according to the proposal comprising a monitoring assembly according to the proposal for carrying out the method according to the proposal, and FIG. 2 shows a flow diagram of the method according to the proposal.

The invention relates to a method for operating a labeling system for labeling individual packs. FIG. 1 shows the labeling system in a schematic illustration comprising a labeling device 1 embodied in particular as a price labeling device.

The labeling device 1 is equipped with a feed assembly 2 for transporting respective packs. The feed assembly 2 is preferably a belt conveyor or a roller conveyor, optionally also at least one robot arm, for moving the respective packs. The feed assembly 2, here the belt conveyor, comprises here and preferably at least one transport belt 3, via which the respective packs, not illustrated in FIG. 1, are transported along a transport direction.

Furthermore, a dispensing assembly 4 for dispensing a label detachable from a material strip 5 is provided. A label detachable from a material strip 5 is taken to mean, in particular, a label which is attached by its adhesive surface detachably on a carrier strip, which forms the material strip 5 and can consist of paper and/or plastic, for example. It is likewise possible for the label to be produced by separating a partial section from a printable or printed material strip 5, for instance by cutting and/or tearing the material strip 5. The method according to the proposal is preferably applied to labels which are embodied as adhesive labels and which already have an adhesive surface on the material strip 5. The use of adhesive-free labels is likewise conceivable, too, which only later are provided with an adhesive surface or applied to an adhesive surface on the respective pack.

In addition, the labeling device 1, here in a common housing with the dispensing assembly 4, comprises an application assembly 6 for applying the dispensed label to the respective pack. Preferably, the dispensed label is picked up by a punch, which is embodied here and preferably as an oscillating punch 7, and is applied to the respective pack. In particular, the punch comprises a blowing head for sucking up and blowing off the label. During application, the oscillating punch 7 here carries out a movement along the transport direction in order to enable the pack moved by means of the feed assembly 2 to be labeled. By means of the application assembly 6, the label can be applied to the pack with contact by pressing the label thereon. Additionally or alternatively, it is conceivable for the label to be applied without contact, for example by a blowing head of the punch blowing off the label onto the pack by producing a blast of compressed air directed toward the pack.

The feed assembly 2, the dispensing assembly 4 and the application assembly 6 each form functional units of the labeling device 1. Besides the functional units already mentioned, even further functional units can be provided, as will be explained in even greater detail below. Likewise, the labeling system can also comprise a plurality of labeling devices 1, in particular of the kind described here.

At least one or all of the functional units mentioned, that is to say here and preferably at least the feed assembly 2, the dispensing assembly 4 and the application assembly 6, each comprise a sensor assembly 8, 9, 10, which can be used to determine sensor data with regard to carrying out a labeling routine.

The labeling device 1 furthermore comprises a control assembly 11. In the labeling routine the functional units are controlled by means of the control assembly 11 for the purpose of labeling the individual packs. For this purpose, the control assembly 11 preferably comprises control electronics for implementing the control tasks that arise in the context of the labeling routine. The control assembly 11, as also illustrated in a simplified manner in FIG. 1, can be a central control assembly 11, which controls all or at least a portion of the functional units. It is likewise possible for the control assembly 11 to comprise a plurality of decentralized control units that communicate with one another, each functional unit preferably being assigned a respective control unit.

The sensor data determined by the respective sensor assemblies 8, 9, 10 are communicated to the control assembly 11 and serve firstly for controlling the functional units in the labeling routine. In this case, each of the sensor assemblies 8, 9, 10 comprises at least one sensor and preferably a plurality of sensors, which determine sensor data for example on the basis of optical, acoustical, mechanical and/or electronic measurement variables. By way of example, the sensors are embodied as temperature sensors and/or as moisture sensors.

Preferably, the sensor assembly 8 of the feed assembly 2 can comprise sensors for determining the transport speed and the rotational speed of the drive assemblies driving the transport belt 3. The dispensing assembly 4 comprises for example a sensor assembly 9 having sensors for determining the speed, the length and the current position of the material strip 5. The application assembly 6 comprises in particular a sensor assembly 10 for ascertaining the position and orientation of the oscillating punch 7. In respect of further embodiments of the sensor assemblies, reference may be made to measures known to the person skilled in the art for controlling the operation of the functional units of the labeling device 1 in the labeling routine on the basis of sensor technology.

The labeling system comprises a monitoring assembly 12. During the labeling routine, in a monitoring routine, by means of the monitoring assembly 12, the sensor data determined by the sensor assemblies 8, 9, 10 of the functional units are captured in accordance with a sensor capture density predefined for the respective functional unit. In respect of the embodiment of the monitoring routine, reference may supplementarily be made to the introductory explanations.

"Determining" sensor data by means of the sensor assemblies 8, 9, 10 is understood to mean any provision of measured values ascertained by sensor measurements of the respective sensor assembly 8, 9, 10, and of variables derived therefrom, which are communicated for example to the control assembly 11. By contrast, "capturing" the determined sensor data by means of the monitoring assembly 12 is understood to mean acquiring—in the sense of receiving—, in particular storing, and optionally processing sensor data by means of the monitoring assembly 12, preferably only a portion of the determined sensor data being captured by means of the monitoring assembly 12. In principle, the monitoring assembly 12 captures the sensor data determined by the sensor assemblies 8, 9, 10 in accordance with the sensor capture density predefined for the respective functional unit.

The sensor capture density predefines an amount of sensor data to be captured for the respective functional unit, a higher sensor capture density corresponding to a higher amount of sensor data to be captured. The sensor capture density contains a predefinition to the effect of which and how many of the determined sensor data are captured by the monitoring assembly 12. Preferably only a smaller amount of sensor data in comparison with the entire sensor data determined or determinable by the sensor assemblies 8, 9, 10 is captured by way of the sensor capture density. In this case, the amount of sensor data can be understood to mean the size occupied by the sensor data over time on a data memory, for example in bits, wherein the sensor data can be present in compressed or uncompressed form.

The monitoring assembly 12 can be integrated in the control assembly 11. The monitoring assembly 12 can likewise be embodied as a separate assembly that is in communication with the labeling system. The monitoring assembly 12 can be embodied for example as an external assembly that communicates with the labeling system and in particular the sensor assemblies 8, 9, 10 and/or the control assembly 11 via a network.

The labeling system comprises a user interface 13, which is equipped here and preferably with a touchscreen. By way of the user interface 13, it is possible to visualize system parameters of the functional units in the labeling routine and for example also sensor data or variables derived therefrom for a user of the labeling system. The user can likewise influence the carrying out of the labeling routine, for example, by way of an input by means of the user interface 13.

What is essential, then, is that a user query routine is carried out by means of the monitoring assembly 12, in which user query routine a user, by means of the user interface 13 of the labeling system, is requested to input a state relating to a functional aspect of the labeling system and the state thereupon input by the user is communicated to the monitoring assembly 12, that the monitoring assembly 12 compares the input state with a predefined state and, in the event of a deviation of the input state from the predefined state, carries out an internal reaction routine.

In this respect, FIG. 2 shows a schematic sequence of the method according to the proposal comprising the user query routine and also the subsequent labeling routine and monitoring routine with various actions that can be carried out.

In action 14, a user of the labeling system, by means of the user interface 13, is requested to input a state relating to a functional aspect of the labeling system. "State" is understood to mean a subjective measure of quality regarding a classification of the quality of the work result and/or the process quality in relation to the respective functional aspect.

In action 15, the user inputs the state by means of the user interface 13.

In action 16, the state input by the user is communicated to the monitoring assembly 12.

By means of the monitoring assembly 12, in action 17, the state input on the part of the user is compared with a state predefined on the part of the system. The predefined state for the affected functional aspect is for example representative of a course of the labeling routine appertaining to normal operation, and of the fact that for example the quality of the work result and/or the process quality in relation to the respective functional aspect corresponds to the expected quality. In this case, the input state need not necessarily be compared with an individual predefined state. Rather, the input state can also be checked to the effect of whether it lies in a predefined range of states.

What is furthermore essential is that in the internal reaction routine carried out by the monitoring assembly 12, by comparison with the previous sensor capture density, a changed, in particular increased or decreased, sensor capture density of at least one functional unit is predefined.

In one preferred embodiment, in the internal reaction routine the predefinition of the changed, in particular increased or decreased, sensor capture density of at least one functional unit is performed depending on whether the input state falls below or exceeds the predefined state.

In FIG. 2, in response to falling below the predefined state, in action 18, the internal reaction routine is initiated by means of the monitoring assembly 12. Falling below the predefined state makes it clear, for example, that the quality of the work result and/or the process quality in relation to the respective functional aspect lies below the quality expected by the user.

Preferably, in the internal reaction routine, in response to falling below the predefined state, a sensor capture density of at least one functional unit that is increased by comparison with the previous sensor capture density is predefined, such that a larger amount of sensor data for the respective functional unit is captured by means of the monitoring routine following the user query routine.

By contrast, in the flowchart according to FIG. 2, in action 19, in the event of the state being input, the predefined state is exceeded and the monitoring assembly 12 thus recognizes that, by comparison with previously, there is an improved quality of the work result and/or improved process quality in relation to the respective functional aspect. The state predefined on the part of the system in this case is, in particular, the state which was input by the user in a preceding user query routine and which—in a manner expressing the dissatisfaction of the user—was decreased in comparison with an optimum state. By way of example, after the preceding user query routine in which a comparatively low state was input, maintenance or repair work was carried out on the labeling device 1, which has resulted in an improvement in the quality of the work result and/or the process quality in relation to the respective functional aspect. The user is now more satisfied and therefore inputs a state higher than the predefined state. Preferably, here as well an internal reaction routine can be initiated by means of the monitoring assembly 12, the sensor capture density of at least one functional unit being newly predefined and in particular reduced on the basis of the input state.

In one preferred embodiment, in the internal reaction routine a degree of the deviation of the input state from the predefined state is determined and in the internal reaction routine the predefinition of the changed, in particular increased or decreased, sensor capture density of at least one functional unit is performed depending on the degree of the deviation. Preferably, in the internal reaction routine the sensor capture density of at least one functional unit is predefined on the basis of the input state in such a way that a higher sensor capture density is predefined with a lower state and/or a lower sensor capture density is predefined with a higher state.

In particular, in the event of the input state falling below the predefined state, the sensor capture density of the assigned functional unit is increased by comparison with a predefined sensor capture density appertaining to normal operation. The predefined sensor capture density appertaining to normal operation is understood to mean a sensor capture density which corresponds to customary storage of sensor data for fault analyses, system improvements, for facilitating maintenance or the like.

Preferably, in the event of the input state exceeding the predefined state, the sensor capture density of the assigned functional unit is reduced by comparison with the predefined sensor capture density appertaining to normal operation, such that a smaller amount of sensor data for the respective functional unit is captured by means of the monitoring routine following the user query routine in order to save resources.

What is essential, moreover, is that, following the user query routine, the labeling routine is continued using adapted system parameters of one or more of the functional units, which is represented as action 20 in FIG. 2.

During the labeling routine, furthermore, in action 21, the monitoring routine is carried out using the changed sensor capture density predefined from the user query routine. Accordingly, with the continuation of the labeling routine by way of the monitoring routine sensor data are captured with a sensor capture density adapted to the result of the user query routine.

If the check of the input state by means of the monitoring assembly 12 in action 17 determines that the input state corresponds to the predefined optimum state, an initiation of an internal reaction routine preferably does not happen. Accordingly, in action 20, the labeling routine can continue to be implemented without being changed, wherein in action 21 the monitoring routine is carried out using an unchanged sensor capture density, in particular the sensor capture density appertaining to normal operation.

It is conceivable for the sensor capture density to be changed for all functional units. However, the monitoring routine is used, for example, in the event of a deviation of the input state from the predefined state, to provide an increased amount of sensor data in a targeted manner for the functional unit or functional units affected by the functional aspect. In one embodiment, an assignment of at least one, in particular exactly one, of the functional units to the state is provided on the basis of the relevant functional aspect. The changed, in particular increased, sensor capture density is accordingly predefined for the at least one, in particular exactly one, functional unit assigned to the input state.

The user is requested for example to input a state relating to a predetermined functional aspect (for example the quality of the application of the label), this predetermined functional aspect being assigned at least one functional unit (for example the application assembly 4). The assignment to a functional unit arises in particular as a result of the causality of the working mode of the respective functional unit for the work result associated with the state and/or as a result of the causality of the working mode of the respective functional unit for the process quality associated with the state. Preferably, the assignment of the input state to at least one, in particular exactly one, of the functional units is already predefined from the outset, that is to say already before the beginning of the user query routine, on the basis of a stipulated assignment specification. However, it is also conceivable for an assignment of the input state to at least one, in particular exactly one, of the functional units to be carried out only in the internal reaction routine by means of the monitoring assembly 12, preferably also on the basis of a stipulated assignment specification, for example if the state is input in a free input by the user.

In one preferred, particularly user-friendly embodiment, in the user query routine the user, by means of the user interface 13, is requested to select the state from a compilation of selectable states. This affords a particularly intuitive input of the state.

In one embodiment, the compilation of selectable states can represent a rising scale from a low to a high state. A low state expresses a low satisfaction of the user and a high state expresses a high satisfaction of the user. The state can be represented by a numerical value, for example, a low numerical value representing a low state and a high numerical value representing a high state. In the user query routine the user is requested to input the state on the basis of a selection from the scale. The sensor capture density can thus be predefined in the internal reaction routine in a particularly simple manner on the basis of the input state, for example the changed sensor capture density being determined by way of a mathematical function from the state represented by the numerical value. Preferably in the internal reaction routine the sensor capture density of the assigned functional unit is predefined on the basis of the input state in such a way that a higher sensor capture density is predefined with a lower state or that a lower sensor capture density is predefined with a higher state.

The sensor capture density can be changed in various ways in the internal reaction routine. In this regard, in one embodiment, on the basis of the input state a changed sensor capture density of the respective functional unit is predefined by a changed temporal rate of the sensor data determined by the sensor assembly 8, 9, 10 and/or of the sensor data captured by the monitoring assembly 12 being predefined. The temporal rate of the sensor data determined by the sensor assembly 8, 9, 10 is taken to mean the points in time at which and in particular the predefined time intervals in which the sensor data are determined by the sensor assembly 8, 9, 10. The temporal rate of the sensor data captured by the monitoring assembly 12 is taken to mean the points in time at which and in particular the predefined time intervals in which the sensor data are captured by the monitoring assembly 12. An increase of the sensor capture density can accordingly be achieved by way of temporally closer together points in time and in particular smaller time intervals. A decrease of the sensor capture density can accordingly be achieved by way of temporally further apart points in time and in particular larger time intervals.

The sensor capture density of the assigned functional unit can likewise be predefined on the basis of the input state by the number of activated sensors being predefined. By way of example, the sensor assemblies 8, 9, 10 can comprise sensors which are not absolutely necessary, or not necessary at least at times, for controlling the labeling routine. The sensor capture density can be increased by these additional sensors likewise being activated and used for determining further sensor data. The selection of the activated sensors of the sensor assembly 8, 9, 10 of the assigned functional unit can likewise be predefined. By way of example, specific sensors relating to the functional aspect affected by the state are activated for the purpose of changing the sensor capture density.

Furthermore, the sensor capture density of the assigned functional unit can be predefined on the basis of the input state by the information density of the sensor data determined by the sensor assembly 8, 9, 10 being predefined, as a result of which an information density of the sensor data can be changed. In this regard, a processing mode of a processing of the sensor data that is carried out by means of the sensor assembly 8, 9, 10 can be predefined. In this case, the sensor assembly 8, 9, 10 is configured to carry out a processing of the determined sensor data, for instance in the context of a preprocessing and/or a (pre)evaluation of the sensor data. Examples thereof are determining a temporal profile of sensor data and determining time-dependent variables from the sensor data. The processing mode is a predefinition of whether and in what form a processing by the sensor assembly 8, 9, 10 takes place. For an increase of the sensor capture density, an increase of the information density of the sensor data can thus be provided. This can be done by the processing mode being changed in such a way that an additional processing of the sensor data takes place, for example by sensor data with a temporal relation and/or averaged sensor data being provided by the sensor assembly 8, 9, 10. A decrease of the information density of the sensor data can likewise be provided by a processing of sensor data not taking place, such that for example only raw data of the sensor data are captured in the context of the monitoring routine. In the case of a comparatively low information density of the sensor data, for example, only the values for a physical variable, e.g. the pressure, are determined by the sensor assembly 8, 9, 10 or captured in the context of the monitoring routine, whereas in the case of a comparatively high information density of the sensor data, for example, additionally or alternatively the values for the physical variable, e.g. the pressure, in a form linked with a temporal relation and/or in averaged form are determined by the sensor assembly 8, 9, 10 or captured in the context of the monitoring routine.

After the user has input a state, in one preferred embodiment, in the internal reaction routine the user, by means of the user interface 13, is requested to manually predefine the sensor capture density of at least one functional unit. By way of example, the amount by which the sensor capture density is intended to be increased or reduced can be influenced by the user by means of an input. It is likewise conceivable for the user to deliberately influence the change of the sensor capture density and to be able to activate and/or deactivate individual sensors of the functional units by means of the user interface 13, for example. Preferably, at least one of the functional units is assigned to the input state on the basis of the relevant functional aspect and the assignment is output to the user by means of the user interface 13, thereby indicating to the user which functional unit(s) may be the cause of the deviation from the predefined state.

In a further, preferred embodiment, in the monitoring routine the sensor data captured by means of the monitoring assembly 12 are stored, in particular stored in the monitoring assembly 12. "Storing" the captured sensor data is understood to mean that the captured sensor data are stored on a nonvolatile data memory by means of the monitoring assembly 12. The data memory can be part of the monitoring assembly 12. It is likewise conceivable for the monitoring assembly 12 to cause the captured sensor data to be output, for example to an external data management assembly, which carries out in particular storing of the captured sensor data.

In one preferred embodiment, in the event of a deviation of the input state from the predefined state, by means of the monitoring assembly 12, a plausibility check of the input state with regard to the presence of at least one predetermined plausibility criterion is carried out. An internal reaction routine is initiated only in the event of a successful plausibility check. By way of a suitable definition of the plausibility criterion, it is possible to recognize an incorrect input of the state in the context of the plausibility check.

In preferred embodiments, the labeling device 1 comprises one or more further functional units, each of which is equipped with a sensor assembly and is controlled by the control assembly 11 in the labeling routine. With regard to the application of these further functional unit(s) and sensor assembly/assemblies in the method according to the proposal, reference should be made to the previous explanations concerning the functional units of feed assembly 2, dispensing assembly 4 and application assembly 6.

Particularly preferably, provision is made of a printer assembly 22 for printing on the label detachable or detached from the material strip 5, wherein printing on the label can be effected in principle on the material strip 5 and/or after the label has been detached from the material strip 5 and before the label is applied to the respective pack. Here and preferably provision is made of a printer assembly 22 configured for thermal printing. The printer assembly 22 is preferably part of the dispensing assembly 4 and prints on the labels before the latter are dispensed, in particular at an outlet and/or dispensing edge of the dispensing assembly 4. The printer assembly 22 comprises for example a dedicated sensor assembly having one or more sensors for monitoring the thermal printer and/or a camera for determining the printed image produced on the labels and/or for image recognition, for example for barcode recognition.

In one preferred embodiment, provision is made of a label transport assembly 23 as a further functional unit of the labeling device 1 for transporting the label from the dispensing assembly 4 to the printer assembly 22 and/or to the application assembly 6. The label transport assembly 23 comprises for example a transport belt, in particular continuous belt, which transports labels from a pick-up region, at which the label is taken from the dispensing assembly 4, to a delivery region, in which the label is fed to the printer assembly 22 or the application assembly 6. The label transport assembly 23 for example likewise comprises a dedicated sensor assembly having one or more sensors for determining the speed of the transport belt and/or the position and/or orientation of the labels on the transport belt. In the present case, the label printed on by the printer assembly 22 is dispensed and is fed to the oscillating punch 7 of the application assembly 6 by means of the label transport assembly 23, the application assembly 6 applying the label to a first side of the respective pack.

Here and preferably a further dispensing and printer assembly 24 is provided. The labels provided by the further dispensing and printer assembly 24 are applied on a second side of the respective pack by a further application assembly 25, said second side here being opposite the first side.

Here and in accordance with a further embodiment, a weighing assembly 26 for weighing the respective pack is provided as yet another functional unit of the labeling device 1. The weighing assembly 26 is configured for determining the weight of individual packs and communicates the determined weight to the control assembly 11, such that an individual weight labeling and/or individual price labeling can be printed on the label, for example.

In one preferred embodiment, a pack recognition assembly 27 is provided as yet another functional unit of the labeling device 1. The pack recognition assembly 27 comprises a sensor assembly configured to provide sensor data for ascertaining the shape, type, orientation and/or position of the pack. For this purpose, the pack recognition assembly 27 comprises for example at least one camera and preferably at least one 3D camera.

A further example of a functional unit which can be used in the context of the method according to the proposal is a movement assembly for the printing assembly, which in particular adjusts the printing assembly transversely with respect to the transport direction of the feed assembly 2. As functional unit, provision can furthermore be made of an alignment assembly for the packs, for example a centering device for the packs on the feed assembly 2. In accordance with a further embodiment, provision is made of a label press-on assembly, for example a label press-on roller, which acts on the respective label after and/or during application.

In accordance with a further preferred embodiment of the method according to the proposal, it is provided that the input of the state is carried out by means of an input assembly and an output assembly of the user interface 13. The input assembly preferably comprises at least one from keyboard, touchscreen, mouse and microphone. The output assembly preferably comprises at least one from screen, touchscreen, loudspeaker and printer.

In a further embodiment, the input of the state can be carried out by means of a user interface 13 embodied as a mobile device, which user interface can be provided in addition or as an alternative to a stationary user interface 13 on the labeling system. In this case, a mobile device is understood to mean in particular a cellular phone, a personal digital assistant (PDA), a laptop, a wearable computer and the like. The mobile device can communicate with the control assembly 11 and/or the monitoring assembly 12 via a network, for example a local network, via a mobile radio network and/or via the Internet.

Carrying out the user query routine can be initiated in a time-controlled manner, in particular cyclically, for example stipulated time intervals and/or points in time predefined in a schedule being provided for the user query routine. Additionally or alternatively, the user query routine can be initiated by means of the control assembly 11, for example in response to a predefined fault criterion being satisfied by the sensor signals. In this case, the fault criterion can represent deviation of the sensor signals from a state of the labeling system appertaining to normal operation. Carrying out the user query routine can likewise be initiated in response to a predefined user action. By way of example, the user query routine is initiated in response to maintenance of the labeling system, renovation of at least parts of the labeling system and/or repair of the labeling system, by means of the monitoring assembly 12, such that a query of the state is effected at points in time with high demand for a process analysis. The user query routine can likewise be initiated manually by the user by means of the user interface 13.

In a further, preferred embodiment, in the user query routine the user is requested to input the state relating to a functional aspect which relates to the printed image of the labels. In particular, the functional aspect furthermore relates to the brightness, the contrast, a print quality and/or the alignment of the printed image on the labels, as a result of which in particular an assignment of the functional aspect to at least one functional unit, in particular to the printer assembly 22, can be effected. The print quality is understood to mean in particular the accuracy of the reproduction of a printing original by the printed image and/or the number of printing errors. In a further embodiment, the functional aspect relates to the application of the labels on the respective packs, in particular the alignment, position and/or adhesion of the labels. In accordance with a further embodiment, the functional aspect relates to the productivity of the labeling system and for example the number of labels applied over a predefined time interval.

In one particularly preferred embodiment, in the user query routine the user is requested to input a plurality of states by way of a hierarchy of queries, at least one subordinate query being assigned to at least one superordinate query in the hierarchy. "Hierarchy of queries" can thus be understood to mean a predefined set of questions for a sequence of queries, in particular the predefinition of a succeeding query being concomitantly determined by the input(s) of the user in response to at least one query made previously. By way of the hierarchy of queries, firstly a sequence of frequent queries relevant to the respective labeling system can be effected. Secondly, by way of a targeted sequence of queries, the cause underlying a deviation from the predefined state can be further delimited.

Preferably, on the basis of the hierarchy of queries, at least one functional unit is assigned to the input states. By way of example, in the user query routine firstly the state relating to the print quality is queried. In the event of the input state falling below the predefined state, for example, subsequently a query of the state relating to the brightness, the contrast, the print quality and/or the alignment of the printed image on the labels can be effected in each case. The assignment of the at least one functional unit can be effected depending on the input states.

It is likewise possible for a part of a functional unit to be assigned to a state in the context of the hierarchy of queries.

If falling below the predefined state is present for the print quality, for example, the printer assembly 22, and in particular the print head of the printer assembly 22, can be assigned to this input state. This assignment can be taken into account in the changed sensor capture density, preferably by the sensor data of the sensors which permit a conclusion to be drawn about the function of the print head being acquired with an increased sensor capture density.

It is also possible for a plurality of functional units to be assigned to a state. By way of example, if there is a deviation from the predefined state for the alignment of the printed image on the labels, the printer assembly 22 and the label transport assembly 23 can be assigned to the state and the sensor capture densities of both functional units can be changed in the internal reaction routine.

In a further embodiment, the hierarchy of queries in the user query routine is predefined on the basis of a previously input state. By way of example, firstly further states are queried relating to those functional aspects whose states in a user query routine executed previously deviated from the respectively predefined state.

In order to increase the user-friendliness, in the user query routine the user can be requested to input one state or a plurality of states regarding one functional aspect, a plurality of functional aspects or all functional aspects from an indicated selection of functional aspects.

In order to increase the user-friendliness, in one embodiment, in the user query routine for the purpose of inputting the state the compilation of selectable states is output, in particular visualized, on the basis of an arrangement of selection fields by means of the user interface 13. Preferably, the selection fields are visualized by way of an arrangement along a straight line, a circle or part of a circle, in particular a semicircle, by means of the user interface. The selection fields are accordingly displayed on a screen for simple identification by the user. In order to increase the user-friendliness, the selection fields of the arrangement can be visualized with different colors (for example from red for a low state to green for a high state) and/or with different identifications (for example with numerical values, inscriptions and/or symbols such as emoticons or the like).

In the user query routine the input of the state can be effected by means of the user interface 13 on the basis of tapping a selection field, for example on a touchscreen. Shifting a selection field can likewise be provided as input of the state, for example by means of a drag-and-drop functionality. Preferably, an input by way of shifting a selection controller is possible, the user shifting a controller along a scale for the state, for example. Furthermore, a free text input and/or a voice input of the state are/is likewise conceivable.

According to a further teaching that is accorded independent importance, the above-described labeling system for labeling individual packs is claimed as such. The labeling system comprises a labeling device 1, in particular price labeling device, the labeling device 1 being equipped with a feed assembly 2 for transporting respective packs, with a dispensing assembly 4 for dispensing a label detachable from a material strip 5 and with an application assembly 6 for applying the dispensed label to the respective pack as functional units, at least one of these functional units or all of these functional units in each case comprising a sensor assembly 8, 9, 10, the labeling device 1 comprising a control assembly 11, which in a labeling routine controls the functional units for the purpose of labeling the individual packs, the labeling system comprising a monitoring assembly 12, which during the labeling routine, in a monitoring routine, captures the sensor data determined by the sensor assemblies 8, 9, 10 of the at least one functional unit in accordance with a sensor capture density predefined for the respective functional unit, and the labeling system comprising a user interface 13.

What is essential here is that the labeling system is configured for carrying out the method according to the proposal. In particular, the control assembly 11 is configured to control the functional units for the purpose of carrying out the labeling routine. Preferably, the monitoring assembly 12 is configured for carrying out the monitoring routine and the user query routine according to the proposal. In this respect, reference may be made to all explanations concerning the method according to the proposal.

According to a further teaching that is likewise accorded independent importance, a monitoring assembly 12 for a labeling system according to the proposal is claimed as such, the monitoring assembly 12 being configured for carrying out a monitoring routine during a labeling routine of a labeling device 1 of the labeling system, the monitoring assembly 12, in the monitoring routine, capturing the sensor data determined by the sensor assemblies 8, 9, 10 of the at least one functional unit in accordance with a sensor capture density predefined for the respective functional unit, and the monitoring assembly 12 being configured to be connected to a user interface 13 of the labeling system in terms of control engineering.

What is essential in this case is that the monitoring assembly 12 carries out a user query routine in which a user, by means of the user interface 13 of the labeling system, is requested to input a state relating to a functional aspect of the labeling system and the state thereupon input by the user is communicated to the monitoring assembly 12, that the monitoring assembly 12 compares the input state with a predefined state and, in the event of a deviation of the input state from the predefined state, carries out an internal reaction routine in which, by comparison with the previous sensor capture density, a changed, in particular increased, sensor capture density of at least one functional unit is predefined. In this respect, too, reference may be made to the explanations concerning the monitoring routine and concerning the internal reaction routine in the context of the method according to the proposal. The above-described labeling system according to the proposal preferably comprises the monitoring assembly 12 according to the proposal.

Particularly preferably, the monitoring assembly 12 comprises a memory 28 having program instructions and at least one processor 29 for executing the program instructions, wherein the memory 28 and the program instructions are configured, together with the processor 29, to control the monitoring assembly 12 for carrying out the user query routine and in particular the monitoring routine.

The memory 28 preferably comprises a nonvolatile memory for the program instructions, for example a flash memory, an EEPROM memory, a magnetic memory and/or an optical memory. The memory 28 can furthermore be equipped with a main memory, preferably a random access memory (RAM) or the like. The processor 29 preferably comprises a microprocessor, a digital signal processor and/or an application-specific integrated circuit.

Moreover, according to a next teaching, which is likewise accorded independent importance, a computer program comprising program instructions which cause a processor 29 of the monitoring assembly 12 according to the proposal to execute the user query routine and in particular the monitoring routine when the computer program runs on the processor 29 is claimed as such. In this respect, too, reference may be made to the above explanations concerning the method according to the proposal. The computer program is preferably stored as a computer program product on a nonvolatile memory.

The invention claimed is:

1. A method for operating a labeling system for labeling individual packs, the labeling system comprising a labeling device, the labeling device being equipped with a feed assembly for transporting respective packs, with a dispensing assembly for dispensing a label detachable from a material strip and with an application assembly for applying the dispensed label to the respective pack as functional units, at least one of these functional units or all of these functional units in each case comprising a sensor assembly, the labeling device comprising a control assembly, which in a labeling routine controls the functional units for the purpose of labeling the individual packs, the labeling system comprising a monitoring assembly, which during the labeling routine, in a monitoring routine, captures the sensor data determined by the sensor assemblies of the at least one functional unit in accordance with a sensor capture density predefined for the respective functional unit, and the labeling system comprising a user interface, wherein:

a user query routine is carried out by means of the monitoring assembly, in which user query routine a user, by means of the user interface, is requested to input a state relating to a functional aspect of the labeling system and the state thereupon input by the user is communicated to the monitoring assembly;

the monitoring assembly compares the input state with a predefined state and, in the event of a deviation of the input state from the predefined state, carries out an internal reaction routine in which, by comparison with the previous sensor capture density, a changed, in particular increased, sensor capture density of at least one functional unit is predefined; and following the user query routine, the labeling routine and the monitoring routine are carried out using the changed sensor capture density predefined from the user query routine.

2. The method as claimed in claim 1, wherein in the internal reaction routine the predefinition of the changed sensor capture density of at least one functional unit is performed depending on whether the input state falls below or exceeds the predefined state.

3. The method as claimed in claim 1, wherein in the internal reaction routine a degree of the deviation of the input state from the predefined state is determined, and wherein in the internal reaction routine the predefinition of the changed sensor capture density of at least one functional unit is performed depending on the degree of the deviation.

4. The method as claimed in claim 1, wherein in the event of the input state falling below the predefined state, the sensor capture density of at least one functional unit is increased by comparison with a predefined sensor capture density appertaining to normal operation and/or wherein in the event of the input state exceeding the predefined state, the sensor capture density of at least one functional unit is decreased by comparison with the predefined sensor capture density appertaining to normal operation.

5. The method as claimed in claim 1, wherein an assignment of at least one of the functional units to the state is provided on the basis of the relevant functional aspect or, in the internal reaction routine, at least one of the functional units is assigned to the input state by means of the monitoring assembly, and wherein the changed sensor capture density is predefined for the at least one assigned functional unit.

6. The method as claimed in claim 1, wherein in the user query routine the user, by means of the user interface, is requested to select the state from a compilation of selectable states.

7. The method as claimed in claim 1, wherein the sensor capture density of at least one functional unit is predefined on the basis of the input state by the temporal rate of the determined sensor data, the temporal rate of the captured sensor data, the number of activated sensors, the selection of the activated sensors of the sensor assembly of at least one functional unit and/or the information density of the determined sensor data being predefined.

8. The method as claimed in claim 1, wherein in the internal reaction routine the user, by means of the user interface, is requested to manually predefine the sensor capture density of at least one functional unit.

9. The method as claimed in claim 1, wherein in the monitoring routine the sensor data captured by means of the monitoring assembly are stored and/or the captured sensor data are caused to be output by means of the monitoring assembly.

10. The method as claimed in claim 1, wherein in the event of a deviation of the input state from the predefined state, by means of the monitoring assembly, a plausibility check of the input state with regard to the presence of at least one predetermined plausibility criterion is carried out and an internal reaction routine is initiated only in the event of a successful plausibility check.

11. The method as claimed in claim 1, wherein the labeling device comprises a printer assembly for printing on the label detachable or detached from the material strip, a label transport assembly for transporting the label from the dispensing assembly to the printer assembly and/or to the application assembly, a weighing assembly for weighing the respective pack and/or a pack recognition assembly as a further functional unit or as further functional units having a respective sensor assembly.

12. The method as claimed in claim 1, wherein the state is input by means of an input assembly and an output assembly of the user interface.

13. The method as claimed in claim 1, wherein the state is input by means of a user interface embodied as a mobile device.

14. The method as claimed in claim 1, wherein carrying out the user query routine is initiated in a time-controlled manner and/or wherein carrying out the user query routine is initiated in response to a predefined user action by means of the monitoring assembly.

15. The method as claimed in claim 1, wherein in the user query routine the user is requested to input the state relating to a functional aspect which relates to the printed image of the labels which relates to the application of the labels and/or which relates to the productivity of the labeling system.

16. The method as claimed in claim 1, wherein in the user query routine the user is requested to input a plurality of states by way of a hierarchy of queries, at least one subordinate query being assigned to at least one superordinate query in the hierarchy of queries.

17. The method as claimed in claim 1, wherein the hierarchy of queries in the user query routine is predefined on the basis of a previously input state.

18. The method as claimed in claim 1, wherein in the user query routine the user is requested to input one state or a plurality of states regarding one functional aspect, a plurality of functional aspects or all functional aspects from an indicated selection of functional aspects.

19. The method as claimed in claim 1, wherein in the user query routine for the purpose of inputting the state the compilation of selectable states is output on the basis of an arrangement of selection fields by means of the user interface.

20. The method as claimed in claim 1, wherein in the user query routine the input of the state is effected by means of the user interface on the basis of tapping a selection field, shifting a selection field and/or a selection controller, a free text input and/or a voice indication.

21. A labeling system for labeling individual packs, the labeling system comprising a labeling device, the labeling device being equipped with a feed assembly for transporting respective packs, with a dispensing assembly for dispensing a label detachable from a material strip and with an application assembly for applying the dispensed label to the respective pack as functional units, at least one of these functional units or all of these functional units in each case comprising a sensor assembly, the labeling device comprising a control assembly, which in a labeling routine controls the functional units for the purpose of labeling the individual packs, the labeling system comprising a monitoring assembly, which during the labeling routine, in a monitoring routine, captures the sensor data determined by the sensor assemblies of the at least one functional unit in accordance with a sensor capture density predefined for the respective functional unit, and the labeling system comprising a user interface, wherein the labeling system is configured for carrying out a method as claimed in claim 1.

22. A monitoring assembly for a labeling system as claimed in claim 21, wherein the monitoring assembly is configured for carrying out a monitoring routine during a labeling routine of a labeling device of the labeling system, the monitoring assembly, in the monitoring routine, capturing the sensor data determined by the sensor assemblies of the at least one functional unit in accordance with a sensor capture density predefined for the respective functional unit, and the monitoring assembly is configured to be connected to a user interface of the labeling system in terms of control engineering, wherein the monitoring assembly carries out a user query routine in which a user, by means of the user interface of the labeling system, is requested to input a state relating to a functional aspect of the labeling system and the state thereupon input by the user is communicated to the monitoring assembly, wherein the monitoring assembly compares the input state with a predefined state and, in the event of a deviation of the input state from the predefined state, carries out an internal reaction routine in which, by comparison with the previous sensor capture density, a changed, in particular increased, sensor capture density of at least one functional unit is predefined.

23. The monitoring assembly as claimed in claim 22, wherein the monitoring assembly comprises a memory having program instructions and at least one processor for executing the program instructions, and in that the memory and the program instructions are configured, together with the processor, to control the monitoring assembly for carrying out the user query routine and the internal reaction routine.

24. A computer program comprising program instructions which cause a processor of the monitoring assembly as claimed in claim 22 to execute the user query routine and the internal reaction routine when the computer program runs on the processor.

* * * * *